(12) United States Patent
Matt

(10) Patent No.: US 9,387,781 B2
(45) Date of Patent: Jul. 12, 2016

(54) QUICK ADJUST CONTINUOUSLY ENGAGED RECLINER

(71) Applicant: Samuel James Matt, Hazel Park, MI (US)

(72) Inventor: Samuel James Matt, Hazel Park, MI (US)

(73) Assignee: Magna Seating Inc, Aurora, Ontario (CA)

( * ) Notice: Subject to any disclaimer, the term of this patent is extended or adjusted under 35 U.S.C. 154(b) by 0 days.

(21) Appl. No.: 14/391,743

(22) PCT Filed: Apr. 11, 2013

(86) PCT No.: PCT/CA2013/000348
§ 371 (c)(1),
(2) Date: Oct. 10, 2014

(87) PCT Pub. No.: WO2013/152433
PCT Pub. Date: Oct. 17, 2013

(65) Prior Publication Data
US 2015/0069809 A1    Mar. 12, 2015

Related U.S. Application Data

(60) Provisional application No. 61/623,197, filed on Apr. 12, 2012.

(51) Int. Cl.
*B60N 2/235* (2006.01)
*B60N 2/225* (2006.01)

(52) U.S. Cl.
CPC .............. *B60N 2/235* (2013.01); *B60N 2/2252* (2013.01); *B60N 2/2254* (2013.01); *B60N 2/2356* (2013.01)

(58) Field of Classification Search
CPC ........................................................ B60N 2/2356
USPC ................ 297/367 L, 362, 367 P, 367 R, 366
See application file for complete search history.

(56) References Cited

U.S. PATENT DOCUMENTS

| | | | | |
|---|---|---|---|---|
| 6,112,370 A | * | 9/2000 | Blanchard ............ | B60N 2/2358 16/325 |
| 7,520,568 B2 | * | 4/2009 | Hoshihara ............ | B60N 2/0232 297/362.11 |

(Continued)

FOREIGN PATENT DOCUMENTS

| | | |
|---|---|---|
| DE | 102005046807 | 11/2006 |
| EP | 2106960 | 10/2009 |

(Continued)

*Primary Examiner* — David E Allred
*Assistant Examiner* — Alexander Harrison
(74) *Attorney, Agent, or Firm* — Miller Canfield

(57) ABSTRACT

A disc recliner includes a gear plate disposed between fixed and movable plates. The gear and fixed plates are operatively coupled by a pawl that is selectively engaged with the gear plate. An eccentric element is operatively coupled between the gear and movable plates such that inward-facing teeth on the movable plate are meshingly engaged with outward-facing teeth on the gear plate. When the pawl is disengaged from the gear plate, the movable plate rotates with the gear plate relative to the fixed plate to pivot a seat back to a folded position. When the pawl is engaged with the gear plate, rotation of the eccentric element shifts the engagement point between the inward and outward-facing teeth and causes wobbling rotational movement of the movable plate relative to the gear and fixed plates to pivot the seat back between a plurality of reclined seating positions.

11 Claims, 7 Drawing Sheets

(56) References Cited

U.S. PATENT DOCUMENTS

| | | | | |
|---|---|---|---|---|
| 7,673,943 B2* | 3/2010 | Ohta | B60N 2/0232 | 297/362.11 |
| 7,703,852 B2* | 4/2010 | Wahls | B60N 2/2356 | 297/367 R |
| 7,878,593 B2* | 2/2011 | Nae | B60N 2/2252 | 297/362 |
| 8,002,352 B2* | 8/2011 | Yamada | B60N 2/2356 | 297/366 |
| 8,360,525 B2* | 1/2013 | Cha | B60N 2/0232 | 297/362 |
| 8,430,454 B2* | 4/2013 | Tanguy | B60N 2/2356 | 297/367 L |
| 8,459,743 B2* | 6/2013 | Villarroel | B60N 2/2356 | 297/367 L |
| 8,517,470 B2* | 8/2013 | Roth | B60N 2/20 | 297/354.1 |
| 8,708,412 B2* | 4/2014 | Berndtson | B60N 2/2356 | 297/367 L |
| 8,864,234 B2* | 10/2014 | McCulloch | B60N 2/2358 | 297/367 P |
| 8,931,843 B2* | 1/2015 | Schuler | B60N 2/2252 | 297/367 R |
| 8,985,690 B2* | 3/2015 | Yamada | B60N 2/2358 | 297/341 |
| 9,102,248 B2* | 8/2015 | Matt | B60N 2/682 | |
| 2006/0279121 A1* | 12/2006 | Matsumoto | B60N 2/2252 | 297/362 |
| 2008/0001458 A1 | 1/2008 | Hoshihara et al. | | |
| 2008/0093907 A1* | 4/2008 | Nag | B60N 2/2356 | 297/367 R |
| 2008/0175658 A1* | 7/2008 | Peters | B60N 2/2356 | 403/349 |
| 2008/0185892 A1 | 8/2008 | Peters et al. | | |
| 2009/0289488 A1* | 11/2009 | Mitsuhashi | B60N 2/2227 | 297/354.12 |
| 2010/0117429 A1* | 5/2010 | Mitsuhashi | B60N 2/2252 | 297/354.12 |
| 2012/0169104 A1* | 7/2012 | Stilleke | B60N 2/2356 | 297/362 |
| 2012/0223562 A1* | 9/2012 | Assmann | B60N 2/2356 | 297/362 |

FOREIGN PATENT DOCUMENTS

| | | |
|---|---|---|
| KR | 20110101897 | 9/2011 |
| WO | 2006011649 | 2/2006 |
| WO | 2009022776 | 2/2009 |
| WO | 2013033829 | 3/2013 |

* cited by examiner

QUICK ADJUST CONTINUOUSLY ENGAGED RECLINER

RELATED APPLICATIONS

This application claims priority to and all the benefits of U.S. Provisional Application Nos. 61/623,197, filed Apr. 12, 2012, and entitled "Quick Adjust Continuously Engaged Recliner".

BACKGROUND OF THE INVENTION

1. Field of the Invention

The present invention relates to a disc recliner for a vehicle seat assembly that allows pivotal adjustment of a seat back relative to a seat cushion. More particularly, the present invention relates to a continuous disc recliner having a release feature to quickly adjust a seat back to an easy-entry position or a fold flat position.

2. Description of Related Art

Automotive vehicles typically include one or more seat assemblies having a seat cushion and a seat back for supporting a passenger above a vehicle floor. The seat assembly is commonly mounted to the vehicle floor by a seat track assembly to allow sliding fore and aft adjustment of the seat assembly for passenger comfort. It is also common that the seat back is operatively coupled to the seat cushion by a recliner assembly to allow pivotal adjustment of the seat back relative to the seat cushion.

One well known type of recliner assembly includes a pair of continuous disc recliners that operatively couple the seat back to the seat cushion. A typical prior art continuous disc recliner includes a fixed plate secured to the seat cushion and a movable plate secured to the seat back and rotatably coupled to the fixed plate. The fixed plate is formed to include an outer profile having a plurality of outward-facing teeth and the movable plate is formed to include an inner profile having a plurality of inward-facing teeth. The outward-facing teeth have at least one less tooth than the inward-facing teeth. A drive mechanism is disposed between the movable and fixed plates and is operable for urging the movable plate to rotate relative to the fixed plate. The drive mechanism includes a cam and a pair of wedges that define an eccentric element. The eccentric element creates an eccentricity between the movable and fixed plates which presses a portion of the inward and outward-facing teeth together at an engagement point. When the cam is rotated in a first direction, the wedges are driven in the first direction causing a direction of the eccentricity to shift, thereby shifting the engagement point of the inward and outward-facing teeth. The shifting of the engagement point manifests itself as a wobbling rotational movement of the movable plate in the first direction, thereby tilting or reclining the seat back in a rearward direction. When the cam is rotated in a second direction, the wedges are driven in the second direction causing the direction of the eccentricity to shift, thereby shifting the engagement point of the inward and outward-facing teeth. The shifting of the engagement point manifests itself as a wobbling rotational movement of the movable plate in the second direction, thereby tilting the seat back in a forward direction. The seat back is maintained in a desired seating position due to friction between the inward and outward-facing teeth at the engagement point as well as friction between the drive mechanism and the fixed and movable plates.

One drawback of continuous disc recliners is the inability of providing quick adjustment or "dumping" of the seat back through a large seat back angle to an easy-entry position or a fold flat position overlying the seat cushion. In order to pivot the seat back to the easy-entry position or the fold flat position, continuous disc recliners must be actuated through the entire range of adjustment. While continuous disc recliners offer very good fine adjustment of the seat back, the longer actuation time to move the seat back through the large seat back angle is undesirable. In certain instances, an external release mechanism is provided to disconnect the seat back from the continuous disc recliner to allow the seat back to freely pivot to the easy-entry position or the fold flat position.

It is desirable therefore to provide a continuous disc recliner having a release mechanism to quickly pivot a seat back to an easy-entry position or a fold flat position.

SUMMARY OF THE INVENTION

According to one aspect of the invention, a disc recliner for an automotive vehicle seat operatively couples a seat back and seat cushion allowing pivotal movement of the seat back between a plurality of reclined seating positions and a folded position. The disc recliner includes a fixed plate mounted to the seat cushion and a movable plate mounted to the seat back and rotatably coupled to the fixed plate. The movable plate includes a plurality of inward-facing teeth and a first inner circumferential surface. A gear plate is disposed between the fixed and movable plates and includes a plurality of outward-facing teeth and a second inner circumferential surface. A set of pawls is guided by embossments on the fixed plate between an extended position and a retracted position. In the extended position, the pawls are engaged with the gear plate, thereby coupling the gear and fixed plates together to prevent rotational movement of the gear plate relative to the fixed plate. In the retracted position, the pawls are disengaged from the gear plate, thereby uncoupling the gear and fixed plates to allow rotational movement of the gear plate and the movable plate relative to the fixed plate. A cam is biased in a first direction to maintain the pawls in the extended position and a release shaft rotates the cam in a second direction. A pawl release plate is coupled to the cam for rotation therewith. The pawl release plate moves the pawls from the extended position to the retracted position in response to rotation of the release shaft in the second direction to allow pivotal movement of the seat back to the folded position. A cam-driver and pair of wedges define an eccentric element that is operatively coupled between the first inner circumferential surface of the movable plate and the second inner circumferential surface of the gear plate. The eccentric element causes the inward-facing teeth on the movable plate to meshing engage with the outward-facing teeth on the gear plate at an engagement point. Rotation of the cam-driver in the first and second directions when the pawls are in the extended position urges the wedges in the first and second directions. As the wedges move in the first and second directions, the engagement point between the movable plate and the gear plate shifts causing wobbling rotational movement of the movable plate relative to the gear plate and the fixed plate to pivotally adjust the seat back between the plurality of reclined seating positions.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Referring to the Figures, wherein like numerals indicate like or corresponding parts throughout the several views, a seat assembly (not shown) for use in an automotive vehicle includes a generally horizontal seat cushion (not shown) and a generally upright seat back (not shown) for supporting a seat occupant. The seat back is operatively coupled to the seat cushion by a recliner assembly (partially shown) for providing pivotal movement between an upright seating position, a plurality of reclined seating positions, and an easy-entry position or fold flat position overlying the seat cushion. The recliner assembly generally includes a pair of spaced apart and synchronized continuous disc recliners, one of which is shown at 10 in FIGS. 1 and 2, and is described below in detail.

Figure 1:
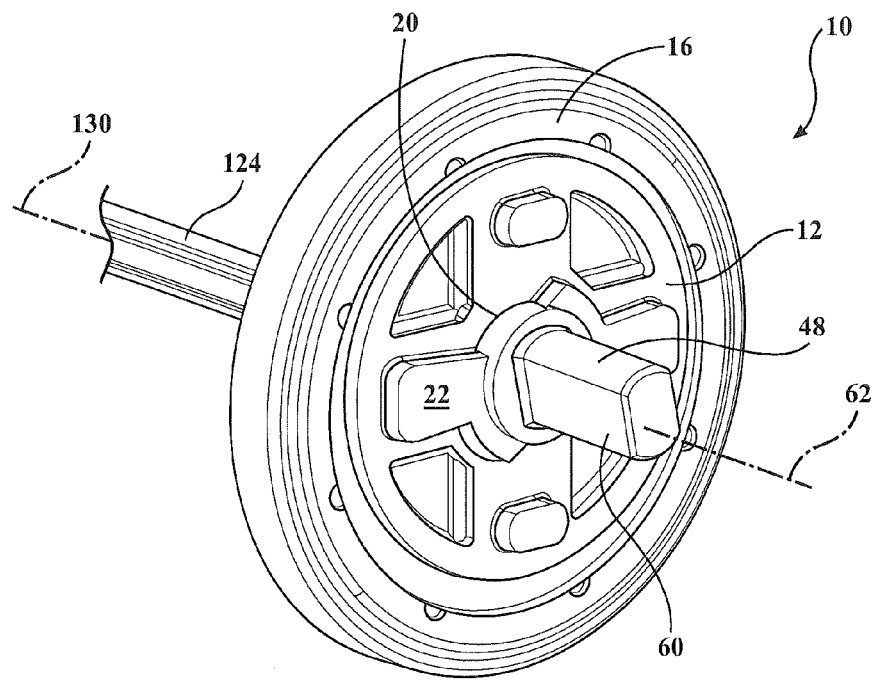
FIG. 1 is an outer perspective view of a continuous disc recliner according to one embodiment of the invention.
Figure 2:
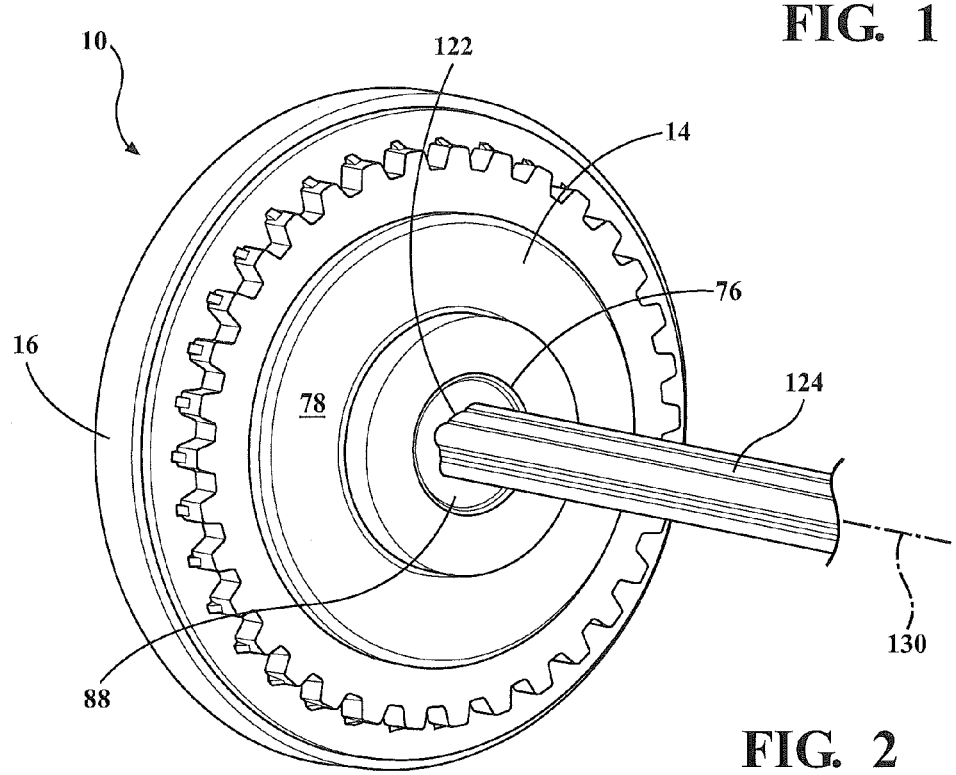
FIG. 2 is an inner perspective view of the continuous disc recliner.
Figure 3:
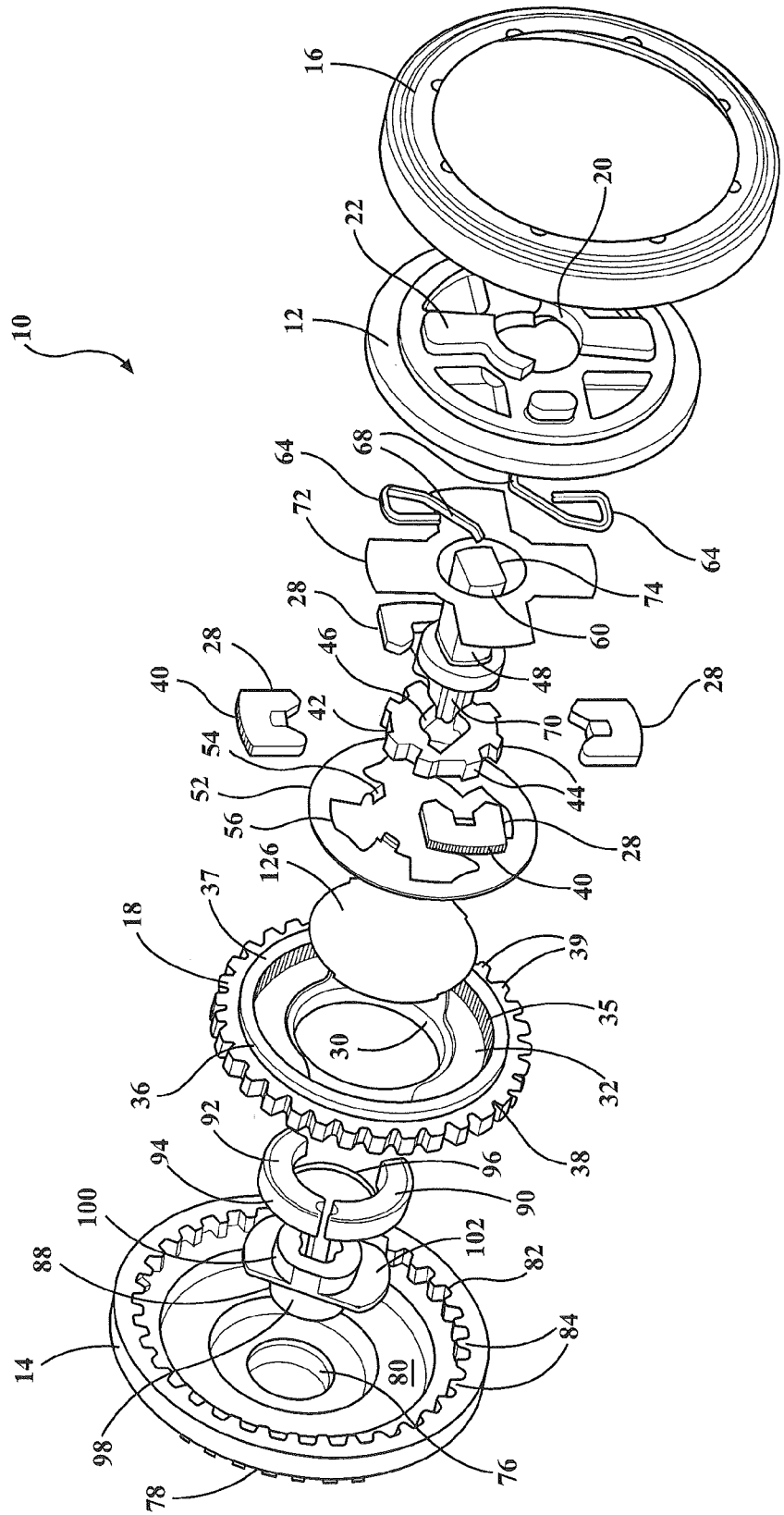
FIG. 3 is an exploded, outer perspective view of the continuous disc recliner.
Figure 4:
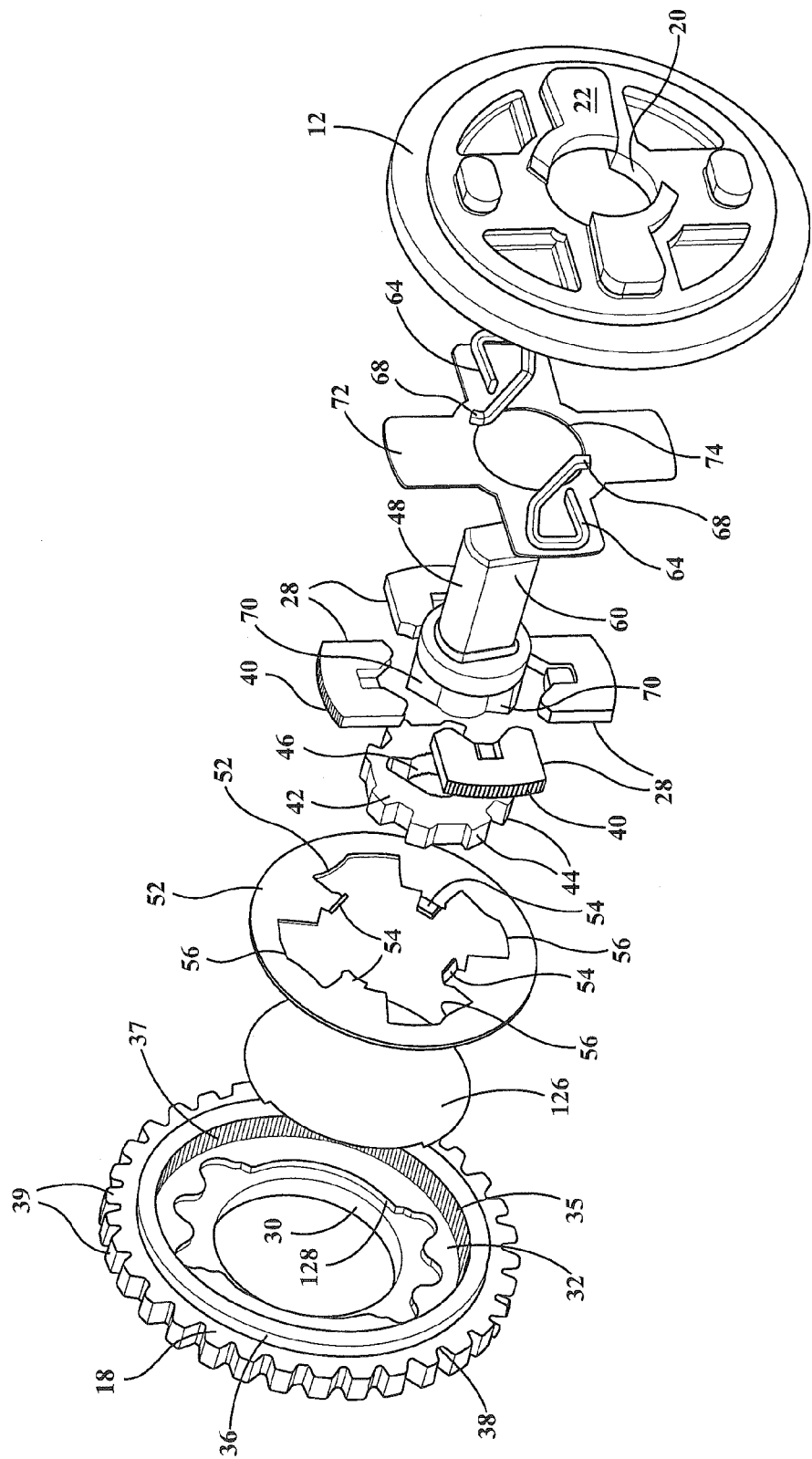
FIG. 4 is a first, fragmentary, exploded, outer perspective view of the continuous disc recliner.
Figure 6:
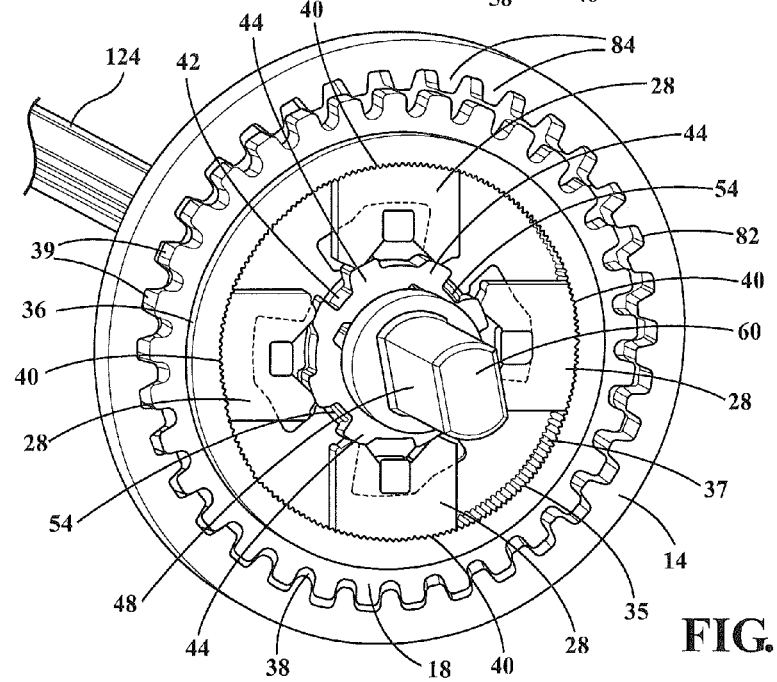
FIG. 6 is a perspective view of a first side of a gear plate illustrating the cam, the pawl release plate, and the set of pawls in an extended position.

Referring to FIGS. 1-3, the disc recliner 10 includes a fixed plate 12 adapted to be secured to the seat cushion and a movable plate 14 adapted to be secured to the seat back and rotatably coupled to the fixed plate 12. The fixed plate 12 and the movable plate 14 are held together by a retaining ring 16 that is fixedly secured to the movable plate 14 and allows a wobbling rotational movement of the movable plate 14 relative to the fixed plate 12, as is described below in more detail. A gear plate 18 is sandwiched between the fixed and movable plates 12, 14 and is meshingly engaged with the movable plate 14, as shown in FIG. 6. In a continuous actuation mode, the gear plate 18 is operatively secured to the fixed plate 12 and the disc recliner 10 provides fine adjustment of the seat back relative to the seat cushion by rotation of the movable plate 14 relative to the gear plate 18 and fixed plate 12. In a discontinuous actuation mode, the gear plate 18 is released from the fixed plate 12 and the disc recliner 10 provides pivotal adjustment of the seat back relative to the seat cushion by rotation of the movable plate 14 and gear plate 18, together, relative to the fixed plate 12. It is understood that rotation of the movable plate 14 relative to the fixed plate 12 causes pivotal movement of the seat back relative to the seat cushion.

Figure 7:
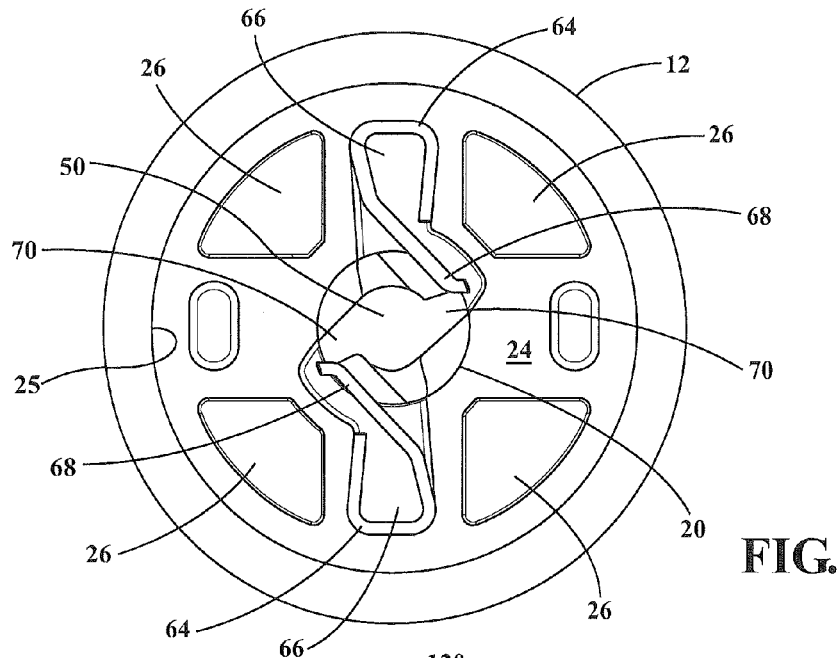
FIG. 7 is a side view of the inner side of the fixed plate illustrating a release shaft and a pair of lever springs.
Figure 10:
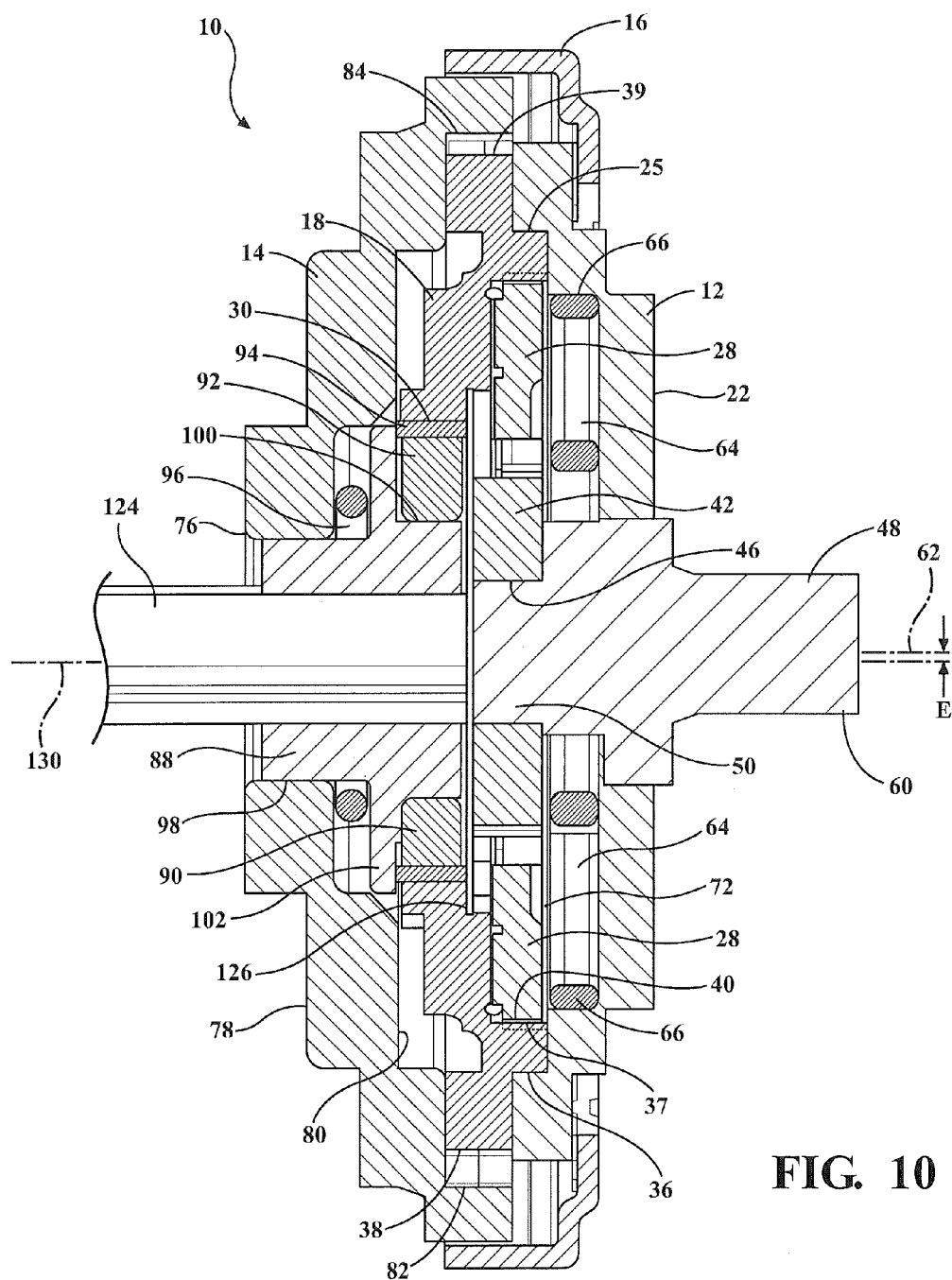
FIG. 10 is a cross-sectional view of the continuous disc recliner.

The fixed plate 12 is circular and includes a first central bore 20 extending axially therethrough. An outer side 22 of the fixed plate 12 is adapted to be fixedly secured to the seat cushion. An inner side 24 of the fixed plate 12 is generally cup-shaped and defines an inner edge 25 extending circumferentially around the fixed plate 12, as shown in FIGS. 7 and 10. The inner side 24 includes four embossments 26, best seen in FIG. 7, protruding therefrom that guide a set of pawls 28 inward and outward in a radial direction to actuate the disc recliner 10 between the continuous actuation mode and the discontinuous actuation mode, as is described below in more detail.

The gear plate 18 is circular and includes a second central bore 30 extending axially therethrough. A first side 32 of the gear plate 18 faces the inner side 24 of the fixed plate 12 and a second side 34 of the gear plate 18 faces the movable plate 14. The first side 32 of the gear plate 18 is generally cup-shaped and defines an inner edge 35 and an outer edge 36, each of which extend circumferentially around the gear plate 18, as shown in FIGS. 6 and 10. A plurality of first inward-facing teeth 37 is disposed around the inner edge 35 and the outer edge 36 engages with the inner edge 25 of the fixed plate 12 to guide rotation of the gear plate 18 relative to the fixed plate 12. An outer edge 38 extending circumferentially around the gear plate 18 includes a plurality of first outward-facing teeth 39 disposed therearound.

In the embodiment shown, there are four pawls 28 and each pawl 28 includes an outer edge having a plurality of second outward-facing teeth 40 that is adapted for meshing engagement with the first inward-facing teeth 37 on the gear plate 18. The pawls 28 are disposed circumferentially around a cam 42 and the cam 42 includes an outer profile having a series of lobes 44 corresponding to an inner profile of each one of the pawls 28. The cam 42 is biased in a first direction (clockwise when viewed from FIG. 6) such that the lobes 44 engage the pawls 28 to maintain the pawls 28 in an extended position. In the extended position, shown in FIG. 6, the second outward-facing teeth 40 on the pawls 28 are in meshing engagement with the first inward-facing teeth 37 on the gear plate 18. Thus, when the pawls 28 are in the extended position, the gear plate 18 is coupled or operatively secured to the fixed plate 12, which prevents rotational movement of the gear plate 18 relative to the fixed plate 12. In other words, with the gear plate 18 operatively secured to the fixed plate 12, the disc recliner 10 is in the continuous actuation mode.

Figure 5:
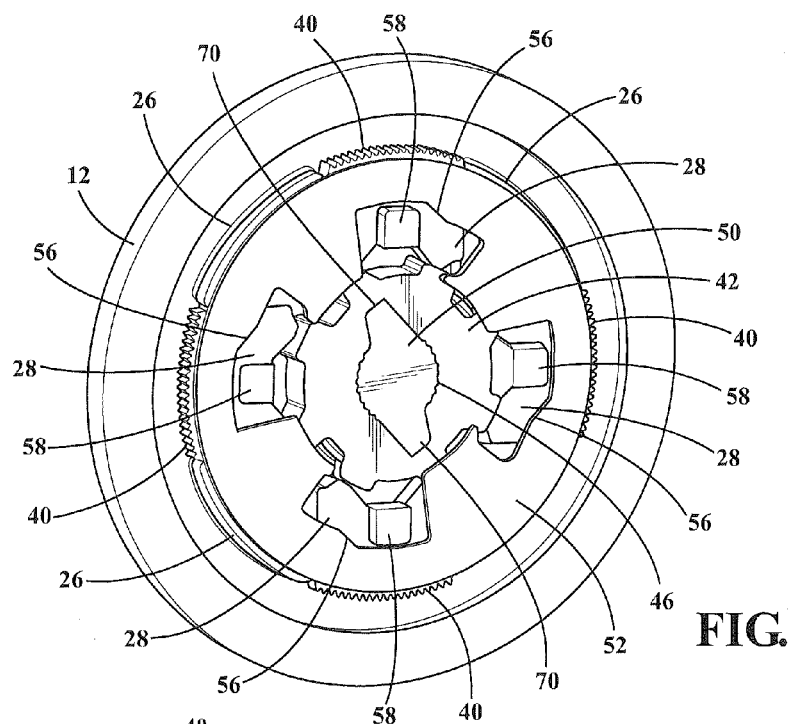
FIG. 5 is a perspective view of an inner side of a fixed plate illustrating a cam, a pawl release plate, and a set of pawls.

The cam 42 also includes a central aperture 46 for receiving a release shaft 48. The release shaft 48 is provided for rotating the cam 42 in a second direction (counterclockwise when viewed from FIG. 6) to actuate the disc recliner 10 from the continuous actuation mode to the discontinuous actuation mode. The release shaft 48 extends in an axial direction through the first central bore 20 of the fixed plate 12 into the central aperture 46 of the cam 42. More specifically, an inner end 50 of the release shaft 48 is press-fit into the central aperture 46 such that rotation of the release shaft 48 in the second direction will rotate the cam 42 in the second direction. A pawl release plate 52 is coupled to the cam 42 for rotation therewith. More specifically, the pawl release plate 52 includes tabs 54 that extend in the axial direction and are disposed between the lobes 44 on the cam 42 such that the pawl release plate 52 and the cam 42 rotate together. The pawl release plate 52 includes an inner profile 56 for receiving a pip 58 that extends in the axial direction from each one of the pawls 28 toward the first side 32 of the gear plate 18, as shown in FIG. 5. When the cam 42 is rotated in the second direction, the pawl release plate 52 also rotates in the second direction and the inner profile 56 urges the pips 58 radially inward, thereby moving the pawls 28 from the extended position to a retracted position. In the retracted position, the second outward-facing teeth 40 on the pawls 28 are disengaged from the first inward-facing teeth 37 on the gear plate 18. Thus, when the pawls 28 are in the retracted position, the gear plate 18 is uncoupled or released from the fixed plate 12, which allows rotational movement of the gear plate 18 relative to the fixed plate 12. In other words, when the gear plate 18 is released from the fixed plate 12, the disc recliner 10 is in the discontinuous actuation mode. A lever or handle mechanism may be attached to an outer end 60 of the release shaft 48 to rotate the release shaft 48 in the second direction.

It is appreciated that the release shaft 48 defines a first axis of rotation 62, shown in FIGS. 1 and 10, extending in the axial direction. The fixed plate 12, gear plate 18, cam 42, and pawl release plate 52 are all centered about the first axis of rotation 62 such that the gear plate 18, cam 42, and pawl release plate 52 rotate about the first axis of rotation 62.

A pair of lever springs 64 biases the release shaft 48 in the first direction, which in turn biases the cam 42 in the first direction, thereby urging the pawls 28 toward the extended position. The lever springs 64 are positioned on opposite sides of the release shaft 48 and each lever spring 64 is disposed in a pocket 66 formed in the inner side 24 of fixed plate 12 between adjacent embossments 26, as shown in FIG. 7. Each lever spring 64 includes a free end 68 that engages a lobe or protrusion 70 on the inner end 50 of the release shaft 48 to bias the release shaft 48 in the first direction. A cross-shaped shim 72 is disposed adjacent to the inner side 24 of the fixed plate 12 and separates the lever springs 64 from the pawls 28. The cross-shaped shim 72 extends between each of the adjacent embossments 26 and includes an opening 74 through which the release shaft 48 extends.

The movable plate 14 is circular and includes a third central bore 76 extending axially therethrough. An outer side 78 of the movable plate 14 is adapted to be secured to the seat back and an inner side 80 of the movable plate 14 faces the second side 34 of the gear plate 18. The inner side 80 is generally cup-shaped and defines an inner edge 82 extending circumferentially around the movable plate 14. A plurality of second inward-facing teeth 84 is disposed around the inner edge 82 on the inner side 80 of the movable plate 14. The first outward-facing teeth 39 on the gear plate 18 are adapted for meshing engagement with the second inward-facing teeth 84 on the movable plate 14. The first outward-facing teeth 39 have at least one less tooth than the second inward-facing teeth 84. The difference in the number of first outward-facing teeth 39 and second inward-facing teeth 84 permits a wobbling rotational movement of the movable plate 14 about the gear plate 18.

Figure 8:
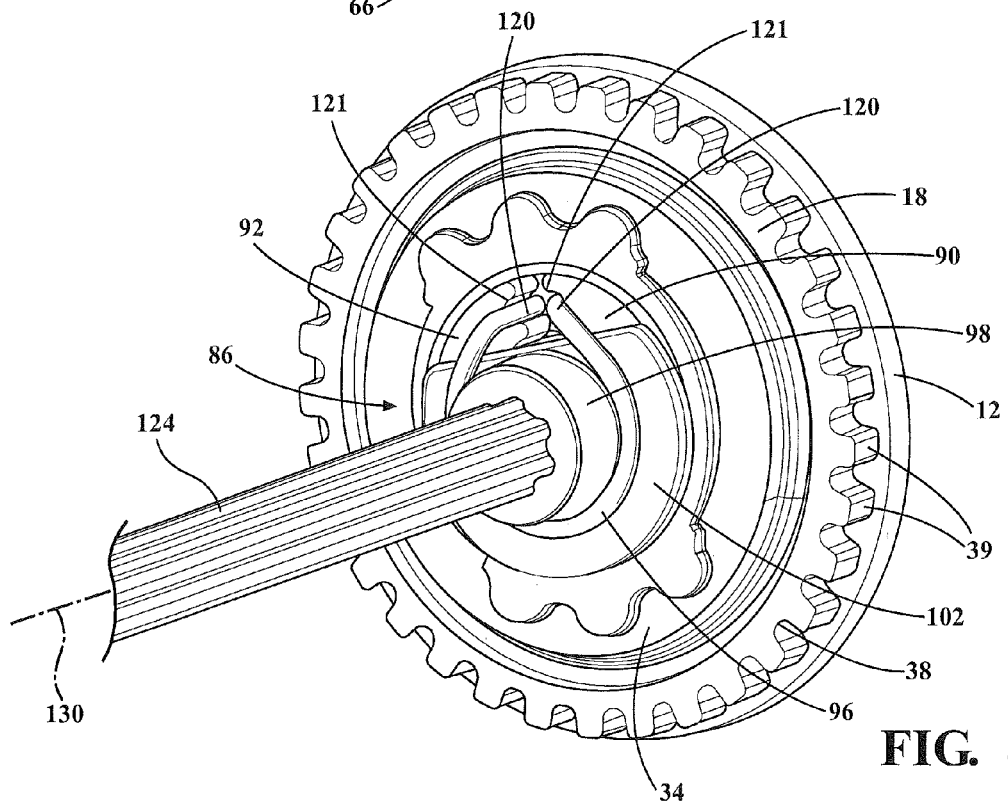
FIG. 8 is a perspective view of a second side of the gear plate illustrating a drive mechanism.
Figure 9:
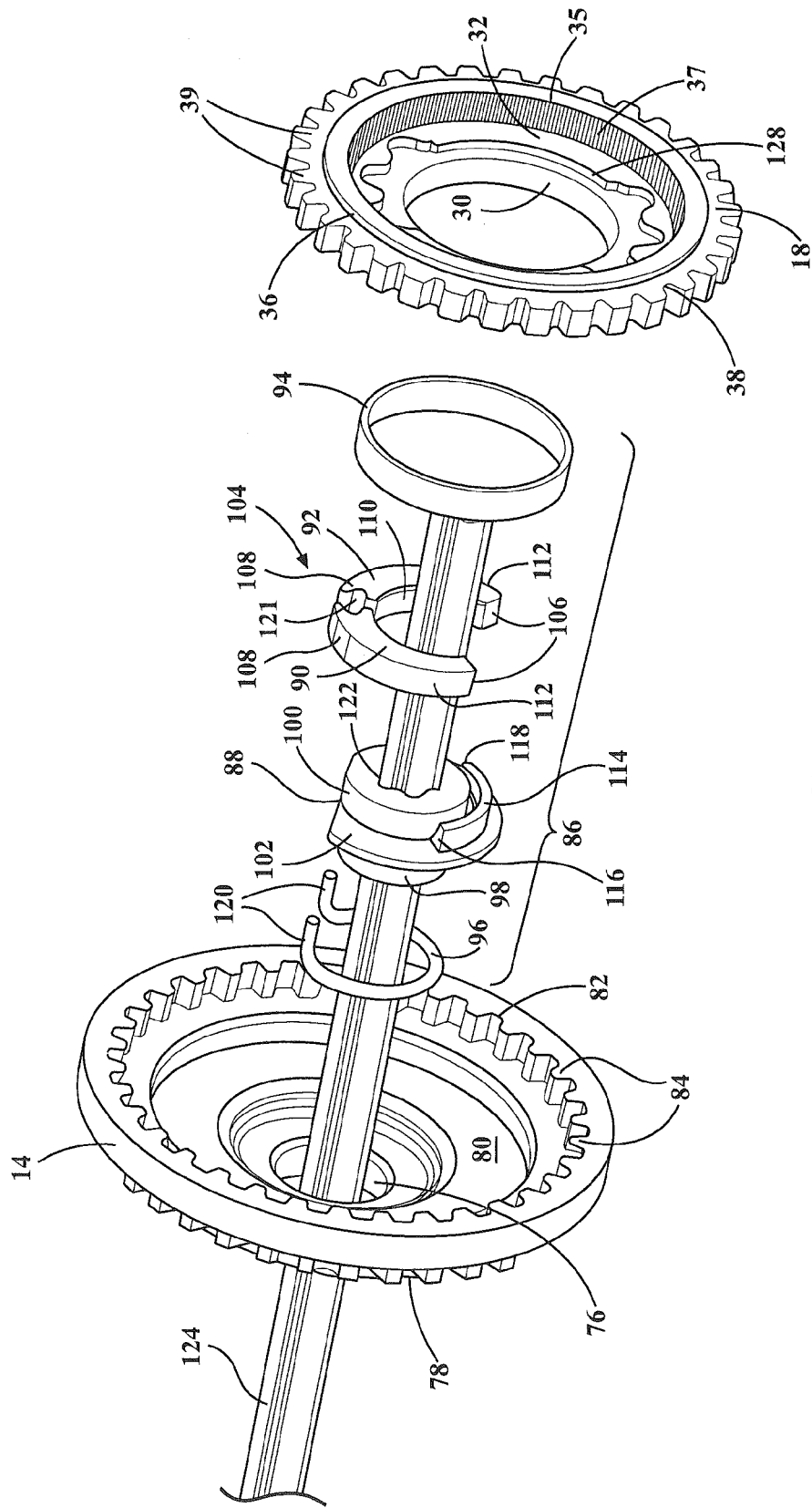
FIG. 9 is a second, fragmentary, exploded, outer perspective view of the continuous disc recliner.

Referring to FIGS. 8-10, a drive mechanism, generally indicated at 86, is disposed between the movable plate 14 and the gear plate 18 and is operable for urging the movable plate 14 to rotate relative to the gear plate 18. The drive mechanism 86 includes a cam-driver 88, a pair of wedges 90, 92, a friction ring 94, and a wedge spring 96. The cam-driver 88 includes a first collar 98 and a second collar 100 that are separated in the axial direction by a flange 102 extending partially circumferentially therearound. The first collar 98 of the cam-driver 88 is disposed within the third central bore 76 of the movable plate 14 such that an outer surface of the first collar 98 engages an inner surface of the third central bore 76. The friction ring 94 is press-fit into the second central bore 30 of the gear plate 18. The wedges 90, 92 are arranged in a mirror-image fashion and define an eccentric element 104. More specifically, each one of the wedges 90, 92 extends between a narrow end 106 and a wide end 108 and includes an inner side 110 and an outer side 112. The inner side 110 of each wedge 90, 92 rests against an outer surface of the second collar 100 and the outer side 112 of each wedge 90, 92 rests against an inner surface of the friction ring 94. The cam-driver 88 also includes a drive segment 114 adjacent to the second collar 100 that extends in a circumferential direction between a first end 116 and a second end 118. The drive segment 114 is positioned radially between the outer surface of the second collar 100 and the inner surface of the friction ring 94. The drive segment 114 is positioned circumferentially between the narrow ends 106 of the respective wedges 90, 92. The wedges 90, 92 are acted upon by the wedge spring 96 to prevent play in the drive mechanism 86. The wedge spring 96 is disposed between the inner side 80 of the movable plate 14 and the flange 102 on the cam-driver 88. The wedge spring 96 includes two legs 120 bent at right angles that are disposed in pockets 121 at the wide ends 108 of the wedges 90, 92, thereby forcing the wedges 90, 92 apart in the circumferential direction.

The cam-driver 88 also includes a central aperture 122 for receiving a drive shaft 124 to rotate the cam-driver 88 in the first and second directions. The drive shaft 124 extends in the axial direction through the third central bore 76 of the movable plate 14 into the central aperture 122 of the cam-driver 88. More specifically, an outer profile of the drive shaft 124 is engaged with the central aperture 122 of the cam-driver 88. In the current embodiment, the drive shaft 124 is rotated by a power motor (not shown). It is contemplated, however, that the drive shaft 124 may be rotated manually, without varying from the scope of the invention. A circular disc-shaped shim 126 is disposed adjacent to the first side 32 of the gear plate 18 to separate the cam-driver 88 from the cam 42. In the current embodiment, the disc-shaped shim 126 is seated in a recess 128 in the first side 32 of the gear plate 18 and is keyed to prevent rotation of the disc-shaped shim 126.

It is appreciated that the drive shaft 124 defines a second axis of rotation 130, shown in FIGS. 2 and 10, extending in the axial direction. The movable plate 14 and cam-driver 88 are centered and rotate about the second axis of rotation 130. Due to the insertion of the eccentric element 104 between the movable plate 14 and the gear plate 18, an eccentricity E is created such that the first axis of rotation 62 is offset from the second axis of rotation 130, best seen in FIG. 10. This eccentricity E causes a portion of the second inward-facing teeth 84 on the movable plate 14 to engage with a portion of the first outward-facing teeth 39 on the gear plate 18 at an engagement point, in a direction that is defined by the eccentricity E, as shown in FIG. 6.

In operation, beginning with the seat back in one of the plurality of reclined seating positions and the disc recliner 10 in the continuous actuation mode, the seat occupant can actuate the drive shaft 124 in the first direction to recline the seat back. Actuating the drive shaft 124 in the first direction causes the cam-driver 88 to rotate in the first direction. Rotating the cam-driver 88 in the first direction causes the first end 116 of the drive segment 114 to engage the narrow end 106 of the wedge 90, which drives or pushes the wedge 90 in the first direction. Driving the wedge 90 in the first direction causes the other wedge 92 to also drive in the first direction because the wedge spring 96 transfers movement from one wedge 90 to the other wedge 92. As the wedges 90, 92 are driven in the first direction, the direction of the eccentricity E shifts, thereby shifting the engagement point between the second inward-facing teeth 84 on the movable plate 14 and the first outward-facing teeth 39 on the gear plate 18. The shifting of the engagement point manifests itself as a wobbling rotational movement of the movable plate 14 in the first direction, thereby reclining the seat back.

Similarly, actuating the drive shaft 124 in the second direction causes the cam-driver 88 to rotate in the second direction. Rotating the cam-driver 88 in the second direction causes the second end 118 of the drive segment 114 to engage the narrow end 106 of the wedge 92, which drives or pushes the wedge 92 in the second direction. Driving the wedge 92 in the second direction causes the other wedge 90 to also drive in the second direction because the wedge spring 96 transfers movement from one wedge 92 to the other wedge 90. As the wedges 90, 92 are driven in the second direction, the direction of the eccentricity E shifts, thereby shifting the engagement point between the second inward-facing teeth 84 on the movable plate 14 and the first outward-facing teeth 39 on the gear plate 18. The shifting of the engagement point manifests itself as a wobbling rotational movement of the movable plate 14 in the second direction, thereby tilting the seat back in a forward direction, i.e., raising the seat back.

Alternatively, beginning with the seat back in one of the plurality of reclined seating positions and the disc recliner 10 in the continuous actuation mode, a user standing next to the seat assembly can actuate the release shaft 48 in the second direction to actuate the disc recliner 10 to the discontinuous actuation mode to quickly pivot the seat back to the easy-entry or fold flat position. Rotating the release shaft 48 in the second direction causes the cam 42 and simultaneously the pawl release plate 52 to rotate in the second direction. As the cam 42 and pawl release plate 52 rotate in the second direction, the inner profile 56 of the pawl release plate 52 engages the pip 58 on each pawl 28 and moves the pawls 28 radially inward from the extended position to the retracted position. In the retracted position, the second outward-facing teeth 40 on the pawls 28 are disengaged from the first inward-facing teeth 37 on the gear plate 18, allowing rotational movement of the gear plate 18 and the movable plate 14, together, in the second direction about the first axis of rotation 62, thereby allowing the seat back to pivot forwardly. A stop (not shown) may be provided to block the seat back in the easy-entry position. Alternatively, the seat back may pivot forwardly to the fold flat position.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A disc recliner operatively coupling a seat back to a seat cushion to allow pivotal movement of the seat back between a plurality of reclined seating positions and a folded position, said disc recliner comprising:

a fixed plate adapted to be mounted to the seat cushion; a movable plate adapted to be mounted to the seat back and rotatably coupled to said fixed plate, said movable plate including a plurality of inward-facing teeth;

a gear plate disposed between said fixed and movable plates, said gear plate including a plurality of outward-facing teeth;

at least one pawl operatively coupled to said fixed plate, wherein said at least one pawl is movable between a first position engaged with said gear plate, thereby coupling said gear plate and said fixed plate together to prevent rotational movement of said gear plate relative to said fixed plate, and a second position disengaged from said gear plate, thereby uncoupling said gear plate and said fixed plate to allow rotational movement of said gear plate and said movable plate relative to said fixed plate;

a cam biased in a first direction for maintaining said at least one pawl in said first position;

a release shaft defining a first axis of rotation, said release shaft operatively coupled to said cam for rotating said cam about said first axis in a second direction opposite said first direction;

a pawl release plate coupled to said cam for rotation therewith, wherein said pawl release plate moves said at least one pawl from said first position to said second position in response to rotation of said release shaft in said second direction to allow pivotal movement of the seat back to the folded position; and a cam-driver defining a second axis of rotation offset from said first axis of rotation and a pair of wedges acting together and operatively coupled between said movable plate and said gear plate to cause said inward-facing teeth on said movable plate to meshingly engage with said outward-facing teeth on said gear plate at an engagement point, and wherein rotation of said cam-driver about said second axis in said first and second directions when said at least one pawl is in said first position engaged with said gear plate urges said pair of wedges in said first and second directions, respectively, thereby shifting said engagement point to cause wobbling rotational movement of said movable plate relative to said gear plate and said fixed plate to thereby pivotally adjust the seat back between the plurality of reclined seating positions;

wherein said fixed plate includes a fixed central bore, an inner side facing said gear plate, and an opposite outer side; said gear plate includes a second central bore aligned coaxially with said first central bore of said fixed plate, a first side facing said fixed plate, and an opposite second side, and a plurality of circumferential inwardly facing teeth opposite said outwardly facing teeth such that the inwardly facing teeth are positioned radially closer to the second central bore than the outwardly facing teeth, and wherein each of said pawls include a plurality of teeth for engagement with said inwardly facing teeth on said gear plate in said first position to lockingly couple said gear plate and said fixed plate together for rotation relative to said moveable plate.

2. A disc recliner as set forth in claim 1 wherein said cam includes a plurality of radially projecting lobes for engaging said pawls and actuating said pawls from said second position to said first position engaged with said inwardly facing teeth on said gear plate in response to rotation of said cam in said first direction.

3. A disc recliner as set forth in claim 2 wherein said pawls include an axially raised pip and said pawl release plate includes an inner profile shaped to engage said pips and actuate said pawls from said first position to said second position released from said gear plate in response to rotation of said release shaft in said second direction.

4. A disc recliner as set forth in claim 3 further including at least one lever spring coupled between said fixed plate and said release shaft for biasing said release shaft and said cam in said first direction and said pawls in said first position.

5. A disc recliner as set forth in claim 4 including a friction ring having an outer surface press fit into the second central bore of the gear plate and an inner surface, said pair of wedges seated against said inner surface of said friction ring.

6. A disc recliner as set forth in claim 5 wherein said cam driver includes a first collar and a second collar separated axially by a flange extending partially circumferentially therearound, said first collar disposed within a third central bore of said movable plate and the second collar disposed between said pair of wedges.

7. A disc recliner as set forth in claim 6 wherein said cam driver includes a central aperture extending axially therethrough and said disc recliner includes a drive shaft extending axially through said central aperture for actuating rotation of said cam driver in said first and second directions causing said wobbling rotational movement of said movable plate relative to said gear plate.

8. A disc recliner as set forth in claim 7 wherein said pair of wedges includes spaced apart facing narrow ends and opposite spaced apart wider ends, said cam driver having an arcuate drive segment extending radially from said second collar and seated between said spaced apart narrow ends of said wedges for rotating said wedges in said first and second directions in response to rotation of said drive shaft and said cam driver.

9. A disc recliner as set forth in claim 8 further including a wedge spring seated between said spaced apart wider ends of said wedges for resisting rotation of said cam driver in said first and second directions.

10. A disc recliner as set forth in claim 9 wherein said release shaft extends axially through said first central bore of said fixed plate and said second central bore of said gear plate defining said first axis of rotation.

11. A disc recliner as set forth in claim 10 wherein said drive shaft extends axially through said third central bore of said movable plate and said central aperture of said cam driver defining said second axis of rotation offset from said first axis of rotation.

\* \* \* \* \*